United States Patent
Jiang et al.

(10) Patent No.: US 10,933,406 B2
(45) Date of Patent: Mar. 2, 2021

(54) METHOD OF PREPARING LARGE-SIZE HIGH-POROSITY FE-DOPED PHOTOCATALYTIC POROUS MAGNETIC MICROSPHERES AND USES THEREOF

(71) Applicant: JIANGXI UNIVERSITY OF SCIENCE & TECHNOLOGY, Jiangxi (CN)

(72) Inventors: Honghui Jiang, Jiangxi (CN); Yiqun Deng, Jiangxi (CN); Hui Yang, Jiangxi (CN); Tongxiang Liang, Jiangxi (CN); Xiaopeng Qi, Jiangxi (CN); Zhuowu Zhen, Jiangxi (CN); Rigang Nie, Jiangxi (CN); Yucheng Lv, Jiangxi (CN); Wenyu Shen, Jiangxi (CN)

(73) Assignee: JIANGXI UNIVERSITY OF SCIENCE & TECHNOLOGY, Ganzhou (CN)

( * ) Notice: Subject to any disclaimer, the term of this patent is extended or adjusted under 35 U.S.C. 154(b) by 42 days.

(21) Appl. No.: 16/395,218

(22) Filed: Apr. 25, 2019

(65) Prior Publication Data
US 2019/0344245 A1    Nov. 14, 2019

(30) Foreign Application Priority Data
May 11, 2018  (CN) .......................... 201810447613.8

(51) Int. Cl.
*B01J 23/78*    (2006.01)
*B01J 23/745*    (2006.01)
(Continued)

(52) U.S. Cl.
CPC ............. *B01J 23/745* (2013.01); *B01J 23/78* (2013.01); *B01J 23/80* (2013.01); *B01J 23/83* (2013.01);
(Continued)

(58) Field of Classification Search
CPC . B01J 23/745; B01J 23/78; B01J 23/80; B01J 23/83; B01J 35/00; B01J 35/02;
(Continued)

(56) References Cited

U.S. PATENT DOCUMENTS

2016/0158733 A1* 6/2016 Shen .................... B01J 35/1014
                                                    208/137

FOREIGN PATENT DOCUMENTS

CN           105727963 A  *  7/2016

OTHER PUBLICATIONS

CN-105727963-A; Jul. 2016, CN ; Jiang Cuifeng translation (Year: 2016).*

* cited by examiner

*Primary Examiner* — Cameron J Allen
(74) *Attorney, Agent, or Firm* — Wayne IP; Tony Hom (57) ABSTRACT

A method of preparing large-size high-porosity Fe-doped photocatalytic porous magnetic microspheres, including: dissolving a soluble macromolecule in a distilled water to obtain a solution A having a concentration of 0.5-1.5 wt %; adding a photocatalyst to the solution A, and uniformly stirring the solution A to obtain a suspension B; mixing a saturated soluble ferric salt solution with the suspension B, and uniformly stirring the mixture to obtain a suspension C; dropwise adding the suspension C to a high-concentration alkali solution by a syringe equipped with a suitable needle size to form microspheres; ageing the reaction system and drying the formed microspheres after adding; calcining the dried microspheres at 600-1100° C.; cooling the calcined microspheres to obtain the large-size high-porosity Fe-doped photocatalytic porous magnetic microspheres.

9 Claims, 6 Drawing Sheets

(51) Int. Cl.
*B01J 23/80* (2006.01)
*B01J 23/83* (2006.01)
*B01J 35/00* (2006.01)
*B01J 35/02* (2006.01)
*B01J 35/08* (2006.01)
*B01J 37/00* (2006.01)
*B01J 37/04* (2006.01)
*B01J 37/08* (2006.01)
*C02F 1/32* (2006.01)
*C02F 1/72* (2006.01)
*C02F 101/30* (2006.01)

(52) U.S. Cl.
CPC ......... *B01J 35/004* (2013.01); *B01J 35/0033* (2013.01); *B01J 35/023* (2013.01); *B01J 35/08* (2013.01); *B01J 37/0072* (2013.01); *B01J 37/04* (2013.01); *B01J 37/08* (2013.01); *C02F 1/32* (2013.01); *C02F 1/725* (2013.01); *C02F 2101/308* (2013.01); *C02F 2305/10* (2013.01)

(58) Field of Classification Search
CPC ... B01J 35/08; B01J 37/00; B01J 37/04; B01J 37/08; C02F 1/32; C02F 1/72
See application file for complete search history.

METHOD OF PREPARING LARGE-SIZE HIGH-POROSITY FE-DOPED PHOTOCATALYTIC POROUS MAGNETIC MICROSPHERES AND USES THEREOF

CROSS-REFERENCE TO RELATED APPLICATIONS

This application claims the benefit of priority from Chinese Patent Application No. CN201810447613.8, filed on May 11, 2018. The content of the aforementioned application, including any intervening amendments thereto, is incorporated herein by reference in its entirety.

TECHNICAL FIELD

The present disclosure relates to preparation of material, particularly to a method of preparing a photocatalytic material and a use method thereof, and more particularly to a method of preparing large-size high-porosity Fe-doped photocatalytic porous magnetic microspheres and a use method thereof.

BACKGROUND OF THE INVENTION

Currently, photocatalysis technology, which is expected as an important means to solve the environmental problems in the future, becomes a focus in the research of chemistry and environment. The photocatalytic technology can be used for degrading and mineralizing various nonbiodegradable persistent toxic organic pollutants in water and air, and for antibacterial and deodorizing and treating heavy metal ions such as $Hg^{2+}$, $Ag^+$ and $Cr^{6+}$ in the wastewater.

Over the years, a lot of research has been made on the production and modification of advanced photocatalytic materials, and a great progress has been made. However, there are still many problems to be solved before the photocatalytic materials are used for commercial applications. On the one hand, due to a low utilization rate of visible light and a high photoinduced electron-hole recombination rate, the catalyst has a poor catalytic activity. Research showed that the defects will be introduced to the material by doping a transition metal element having a multi-level structure, which serves as a low potential well of the photoinduced electron-hole, reducing the photoinduced electron-hole recombination rate, thus effectively improving the catalytic property of the material. Fe is considered to be one of the elements having the best doping effects among various transition metal dopants. As a metal element ranked second in content in the earth's crust, Fe is cheap and easy to obtain, and its compounds are generally non-toxic, non-polluting and environmentally friendly. For example, in a Fe-doped $TiO_2$ photocatalyst, since the ionic radius (0.78 Å) of $Fe^{3+}$ is very close to that of $Ti^{4+}$ (0.74 Å), $Fe^{3+}$ can smoothly enter a lattice to form a trap center and simultaneously trap photoinduced electrons and holes. The potential of $Fe^{3+}/Fe^{2+}$ is located below the conduction band of $TiO_2$, which provides a transmission path for the electrons excited by the photons to the conduction band; while the potential of $Fe^{4+}/Fe^{3+}$ is located above the valence band of $TiO_2$, which is easy to attract the holes accumulated on the valence band, thereby effectively restraining the electron-holes recombination. In addition, Fe-doping can also introduce impurity levels to improve the responsiveness of $TiO_2$ to the visible light. On the other hand, nano-scale photocatalyst has more surface active sites, which can improve its catalytic activity. However, with the development of photocatalytic materials at nanometer scale, it is difficult to effectively separate the photocatalytic materials from the reaction system by traditional separation methods such as centrifugation, filtration, etc. At present, the rapid recovery of the catalyst nanocrystals is achieved mainly by constructing a magnetic core structure and using an external magnetic field. However, this method has main problems of that the size of the magnetic core is too small and the magnetism is too weak, such that the recovery efficiency of the catalyst cannot be significantly improved.

SUMMARY OF THE INVENTION

In order to overcome the defects of the prior art, the present invention provides a method of preparing large-size high-porosity Fe-doped photocatalytic porous magnetic microspheres and a use method thereof.

The large-size porous microspheres prepared by the method of the present invention achieves an efficient recovery of the catalyst, and have porous structures which facilitate diffusion and mass transfer of macromolecular reactants between the surface and bulk phase of the catalyst, providing a large specific surface area for the catalyst. Therefore, the catalyst has more reactive sites, thereby effectively enhancing the degradation activity of the catalyst. Thus, it has broad application prospects in the field of photocatalysis.

A method of preparing large-size high-porosity Fe-doped photocatalytic porous magnetic microspheres, including:

dissolving a soluble macromolecule in a distilled water to obtain a solution A having a concentration of 0.5-1.5 wt %;

adding a photocatalyst to the solution A, and uniformly mixing the solution A and the photocatalyst under stirring to obtain a suspension B;

mixing a saturated soluble ferric salt solution with the suspension B under stirring to obtain a suspension C;

dropwise adding the suspension C to a high-concentration alkali solution by a syringe equipped with a needle of a suitable size to form microspheres; ageing and drying the microspheres; calcining the microspheres at 600-1100° C. for 30-120 minutes; and cooling the microspheres to obtain the large-size high-porosity Fe-doped photocatalytic porous magnetic microspheres.

In some embodiments, the soluble macromolecule is any one of a sesbania powder, a carboxymethyl cellulose and a guar gum.

In some embodiments, the photocatalyst is any one of a titanium dioxide, a lanthanum potassium titanate, a strontium titanate or a zinc oxide.

Further, the suspension B has a solid content of 35-65 wt %.

In some embodiments, the soluble ferric salt is any one of a ferric chloride or a ferric nitrate.

Further, in the soluble ferric salt solution, the molar ratio of $Fe^{3+}$ ions to the photocatalyst is 15:100 to 45:100.

In some embodiments, the alkali solution is any one of a concentrated ammonia water, a saturated urea solution and a saturated hexamethylenetetramine solution.

In some embodiments, the ageing time is 30-120 minutes, and the drying temperature is preferably 60-80° C.

The needle size of the syringe described above can be selectively adjusted according to the size of the microspheres.

Another object of the present disclosure is to provide a use method of the large-size high-porosity Fe-doped photocatalytic porous magnetic microspheres prepared by the above method, which can be used for catalytic degradation of an organic dye.

In some embodiments, the organic dye is a methylene blue dye.

The principle of the present disclosure is as follows. On the one hand, due to the surface tension, the soluble macromolecule in the suspension C causes the liquid drops to form a spherical shape in the alkali solution. On the other hand, a precipitation reaction occurs rapidly between the $Fe^{3+}$ on the surfaces of the spherical liquid drops and the $OH^-$ in the alkali solution. So that the surfaces of the spherical liquid drops are rapidly solidified, and the spherical liquid drops are completely solidified after being aged for a certain period of time. In addition, in the high-temperature calcination process, the soluble macromolecule thermally decomposes to form a reducing atmosphere, and some $Fe^{3+}$ are reduced to $Fe^{2+}$ to form magnetic $Fe_3O_4$.

Compared to the prior art, the method of the present invention has the following beneficial effects.

(1) The method of the present invention can simultaneously realize the doping and magnetic preparation of the photocatalyst microspheres in one step. $Fe_3O_4$ formed in situ can efficiently recover the catalyst under an external magnetic field, and Fe-doping can further improve the catalytic performance of the catalyst. The method has the advantages of simple process, no need for atmosphere protection, good reproducibility, low cost and being environmentally friendly, and can prepare magnetic microspheres with various diameters.

(2) The large-size porous microspheres of the present invention can not only achieve efficient recovery of the catalyst, but also have porous structures which facilitate diffusion and mass transfer of macromolecular reactants between the catalyst surface and the bulk phase, providing a large specific surface area for the catalyst. Therefore, the catalyst has more reactive sites, thereby effectively enhancing the degradation activity of the catalyst. Thus it has broad application prospects in the field of photocatalysis.

DETAILED DESCRIPTION OF EXAMPLES

Embodiments of the present invention are illustrated in detail as follows. The embodiments are on the basis of the technical solutions of the present invention, which gives a detailed method and a specific operation process. However, the scope of the present invention is not limited to the following embodiments.

According to the information of the present invention, various modifications of the present invention are easy to be made by those skilled in prior art without departing from the spirit and scope of the appended claims. It should be understood that the scope of the invention is not limited to the defined procedures, properties or components, because these embodiments and descriptions are merely illustrative of specific aspects of the invention. In fact, it is apparent to those skilled in prior art that various modifications of the embodiments of the invention are within the scope of the appended claims.

In order to better understand the invention but not to limit the scope of the invention, all numerical parameters representing dosages and percentages as well as other values used in the present invention should be understood in all instances as being attributed by the word "about". Accordingly, unless otherwise stated, the numerical parameters set forth in the specification and the appended claims are approximations, which may vary depending on the desired properties. Each numerical parameter should at least be considered as being obtained based on the reported significant figures and conventional rounding method.

Example 1

In the present embodiment, a method of preparing large-size high-porosity Fe-doped photocatalytic porous magnetic microspheres includes the following steps.

(1) sesbania powder (0.5 g) was dissolved in 100 mL of distilled water to obtain a solution A with a concentration of 0.5 wt %.

(2) titanium dioxide ($TiO_2$, 35 g, 0.438 mol, molecular weight: 79.87) photocatalyst (abbreviated as P-25 below) was added to the solution A, and uniformly mixing under stirring to obtain a suspension B with a solid content of 35 wt %.

(3) saturated $FeCl_3$ solution (11.5 mL, concentration: 92 g/100 mL) was uniformly mixed with the suspension B in step (2) under stirring to obtain a suspension C. The molar ratio of the $Fe^{3+}$ ions and the titanium dioxide was 15:100.

(4) The suspension C was dropwise added to a concentrated ammonia water by a syringe equipped with a No. 6-sized needle to form microspheres. The microspheres were aged for 60 minutes and dried at 80° C.

(5) The microspheres dried in step (4) were calcined at 600° C. for 120 minutes to obtain the Fe-doped titanium dioxide photocatalytic porous magnetic microspheres.

Figure 1:
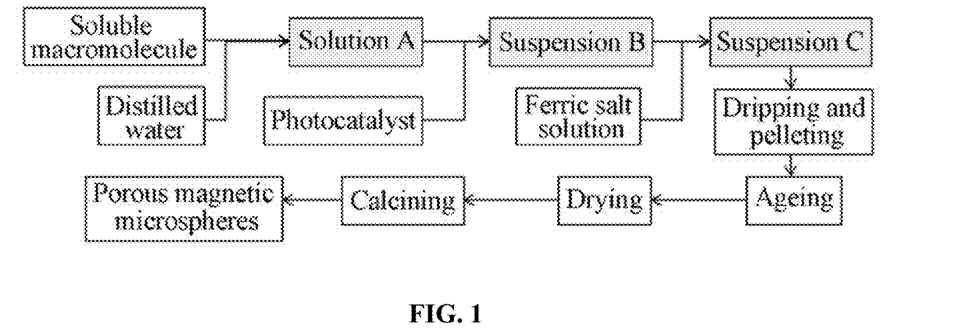
FIG. 1 is a flow chart showing a process for preparing large-size high-porosity Fe-doped photocatalytic porous magnetic microspheres according to the present invention.
Figure 2:
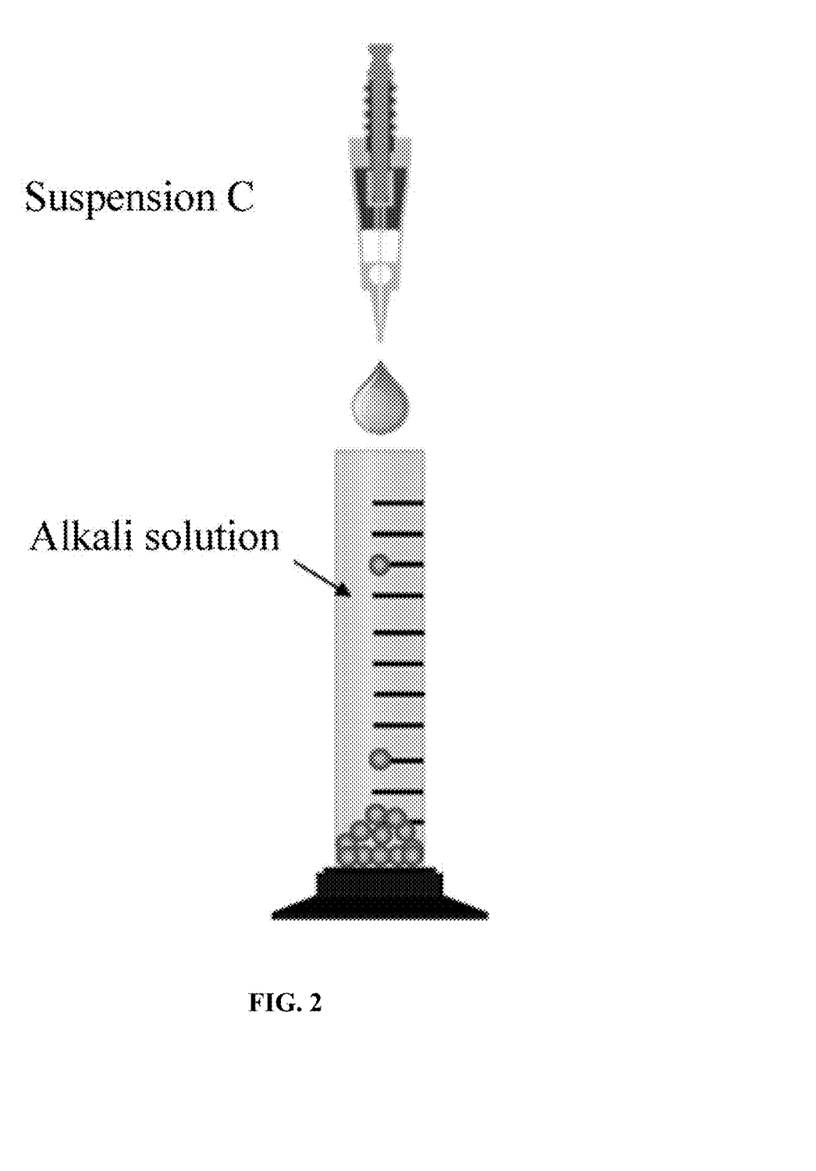
FIG. 2 is a schematic diagram showing a specific process of dripping and pelleting in the preparation process of the large-size high-porosity Fe-doped photocatalytic porous magnetic microspheres according to the present invention.
Figure 3:
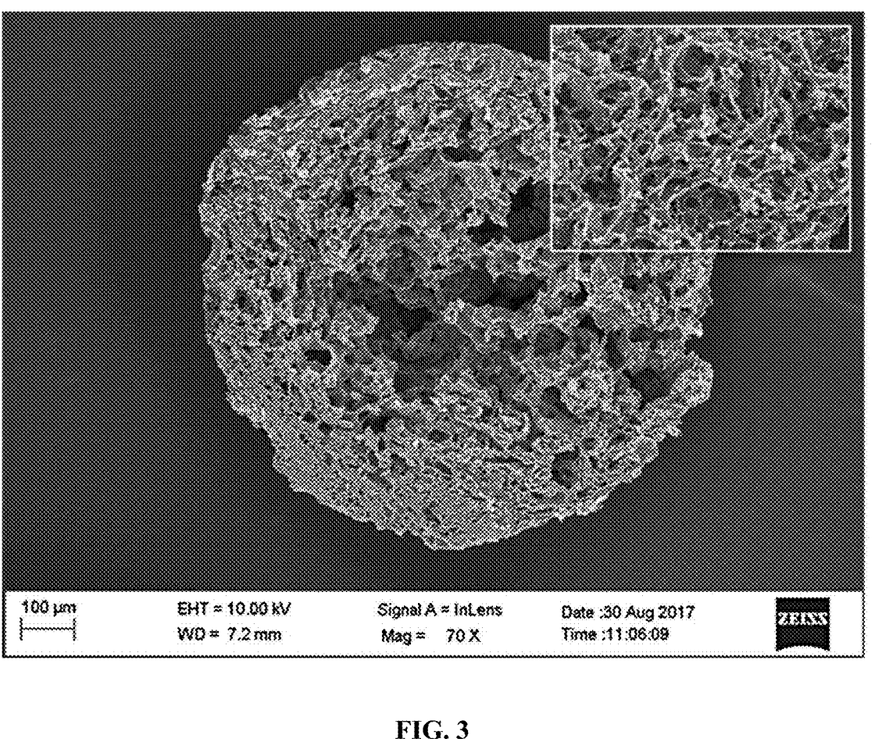
FIG. 3 is a scanning electron microscope image of large-size high-porosity Fe-doped photocatalytic porous magnetic microspheres according to an embodiment of the present invention.
Figure 4:
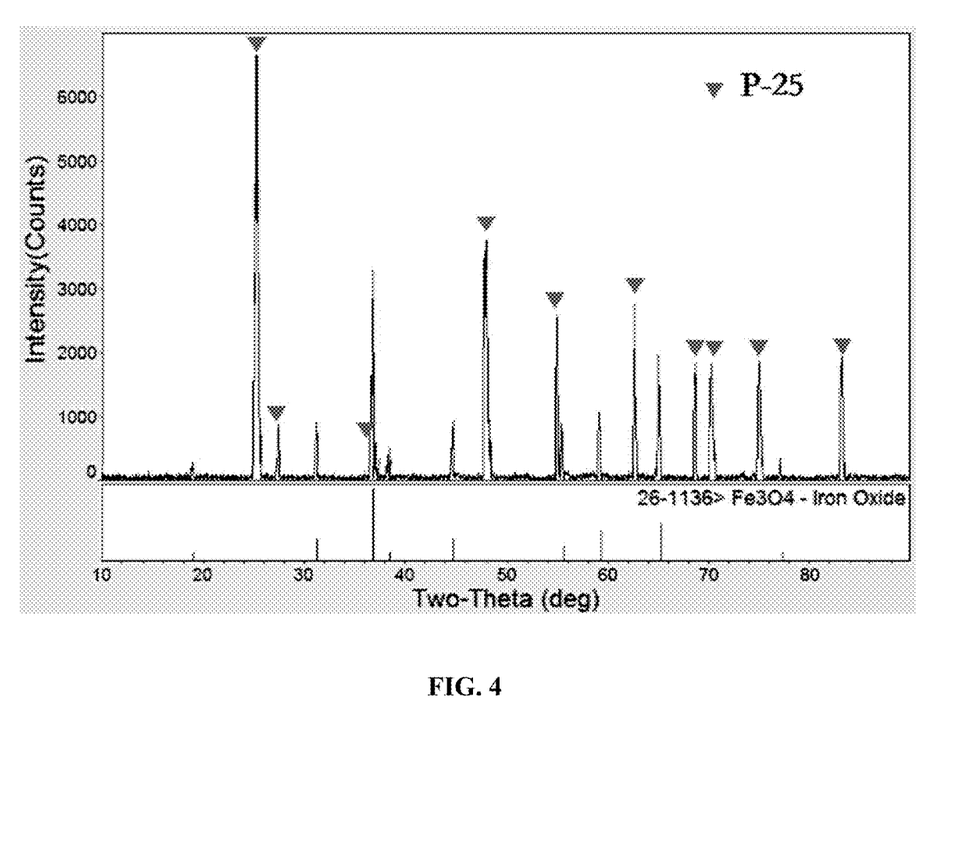
FIG. 4 is an XRD pattern of the large-size high-porosity Fe-doped photocatalytic porous magnetic microspheres according to an embodiment of the present invention.

FIG. 3 shows a scanning electron microscope (SEM) image of the porous magnetic microspheres according to an embodiment of the present invention. FIG. 4 shows an XRD test result of the porous magnetic microspheres. As shown in FIG. 3, the porous magnetic microspheres of the present embodiment have an average particle size of 650 μm and a porosity of up to 82%. As shown in FIG. 4, the crystalline phases of the porous magnetic microspheres are mainly photocatalyst P-25 and magnetic $Fe_3O_4$.

Application Example 1

The Fe-doped titanium dioxide photocatalytic porous magnetic microspheres of the present embodiment are used for catalytic degradation of an organic dye which is a methylene blue dye. The test method of photocatalytic performance is as follows. Methylene blue solution(100 mL, 50 mg/L) was placed in a beaker. The porous microspheres (50 mg) of the present embodiment was added to the beaker under stirring in a reactor box for 30 minutes without turning on a mercury lamp to achieve an adsorption-desorption equilibrium. Then the mercury lamp (500 W) source was turned on to irradiate the solution. A supernatant was extracted after centrifuging in a sampling interval time of 10 minutes. An absorbance of the methylene blue solution at 664 nm (maximum absorption wavelength) after photocatalytic reaction was measured by an ultraviolet-visible spectrophotometer. Finally, concentrations of the methylene blue solution at each time point were calculated according to the obtained data. The used photocatalyst was re-collected and used to perform the test of the photocatalytic performance again after being dried. The test of the photocatalytic performance was repeated 6 times to obtain the degradation data.

Figure 5:
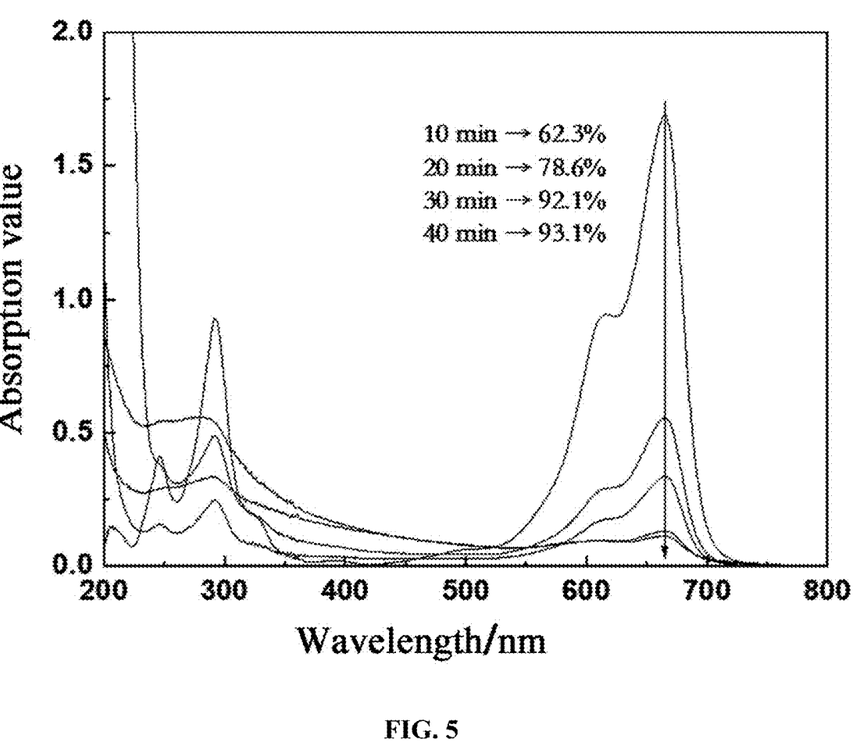
FIG. 5 is a graph showing a degradation rate versus time of the large-size high-porosity Fe-doped photocatalytic porous magnetic microspheres according to an embodiment of the present invention used for catalytic degradation of a methylene blue dye for the first time.

FIG. 5 is a graph showing a degradation rate versus time of the large-size high-porosity Fe-doped photocatalytic porous magnetic microspheres of the present embodiment when it is used for catalytic degradation of a methylene blue dye for the first time. As shown in the test result of the photocatalytic performance in FIG. 5, the photocatalytic degradation rate of the methylene blue dye is up to 93.1% when it is degraded by the porous magnetic microspheres of the present embodiment 1 for 40 minutes.

Figure 6:
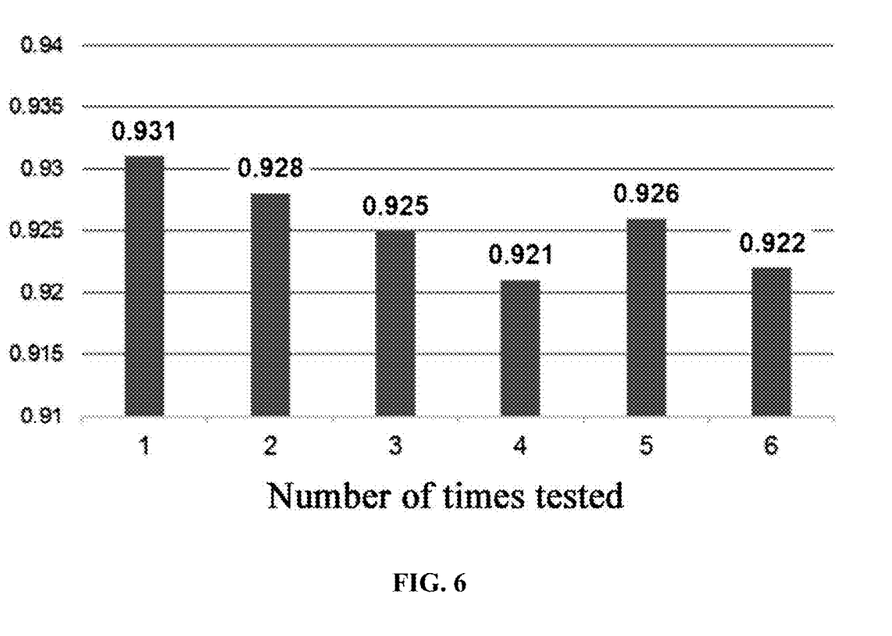
FIG. 6 is a diagram showing comparative degradation rates of the large-scale high-porosity Fe-doped photocatalytic porous magnetic microspheres according to an embodiment of the present invention repeatedly used for catalytic degradation of the methylene blue dye.

The large-size high-porosity Fe-doped photocatalytic porous magnetic microspheres of the present embodiment are used for repeatedly catalytic degradation of methylene blue dye for 6 times. A diagram showing comparative degradation rates of 6 cycles of catalytic degradation in a degradation time of 30 minutes is shown in FIG. 6. As shown in the test data of the degradation performance after repeated use in FIG. 6, the catalytic performance of the porous magnetic microspheres does not change significantly in 6 cycles of catalytic degradation.

Example 2

In the present embodiment, a method of preparing large-size high-porosity Fe-doped photocatalytic porous magnetic microspheres includes the following steps.

(1) carboxymethylcellulose (0.5 g) was dissolved in 100 mL of distilled water to obtain a solution A with a concentration of 1.5 wt %.

(2) lanthanum potassium titanate ($K_2La_2Ti_3O_{10}$, 65 g, 0.1 mol, molecular weight: 659.5) photocatalyst was added to the solution A, and uniformly mixing under stirring to obtain a suspension B with a solid content of 65 wt %.

(3) saturated $FeCl_3$ solution (8 mL, concentration: 92 g/100 mL) was uniformly mixed with the suspension B in step (2) under stirring to obtain a suspension C. The molar ratio of the $Fe^{3+}$ ions and the lanthanum potassium titanate was 45:100.

(4) The suspension C was dropwise added to a saturated urea solution by a syringe equipped with a No. 4-sized needle to form microspheres. The microspheres were aged for 90 minutes and dried at 60° C.

(5) The microspheres dried in step (4) were calcined at 1100° C. for 90 minutes to obtain Fe-doped lanthanum potassium titanate photocatalytic porous magnetic microspheres.

The porous magnetic microspheres of the present embodiment are used for test. The test results show that the porous magnetic microspheres of the present embodiment have an average particle size of 430 μm and a porosity of up to 75%.

The photocatalytic performance test is carried out by the same test method as in the application example 1. The results show that the degradation rate of the Fe-doped lanthanum potassium titanate photocatalytic porous magnetic microspheres of the present embodiment is up to 94.6% when it is used for catalytic degradation of methylene blue dye for 40 minutes for the first time. The catalytic performance of the porous magnetic microspheres does not change significantly in 6 cycles of catalytic degradation.

Example 3

In the present embodiment, a method of preparing large-size high-porosity Fe-doped photocatalytic porous magnetic microspheres includes the following steps.

(1) Guar gum (0.5 g) was dissolved in 100 mL of distilled water to obtain a solution A with a concentration of 0.5 wt %.

(2) Strontium titanate ($SrTiO_3$, 65 g, 0.354 mol, molecular weight: 183.46) photocatalyst was added to the solution A, and uniformly mixing under stirring to obtain a suspension B with a solid content of 65 wt %.

(3) Saturated $Fe(NO_3)_3$ solution (9.5 mL, 138 g/100 mL) was uniformly mixed with the suspension B in step (2) under stirring to obtain a suspension C. The molar ratio of the $Fe^{3+}$ ions and the strontium titanate was 15:100.

(4) The suspension C was dropwise added to a concentrated ammonia water by a syringe equipped with a No. 6-sized needle to form microspheres. The microspheres were aged for 120 minutes and were dried at 60° C.

(5) The microspheres dried in step (4) were calcined at 1000° C. for 120 minutes to obtain the Fe-doped strontium titanate photocatalytic porous magnetic microspheres.

The porous magnetic microspheres of the present embodiment are used for test. The test results show that the porous magnetic microspheres have an average particle size of 680 μm and a porosity of up to 76%.

The photocatalytic performance test is carried out by the same test method as in the application example 1. The results show that the degradation rate of the Fe-doped strontium titanate photocatalytic porous magnetic microspheres of the present embodiment is up to 92.8% when it is used for catalytic degradation of methylene blue dye for 40 minutes for the first time. The catalytic performance of the sample did not change significantly in 6 cycles of catalytic degradation.

Example 4

In the present embodiment, a method of preparing large-size high-porosity Fe-doped photocatalytic porous magnetic microspheres includes the following steps.

(1) Guar gum(1.0 g) was dissolved in 100 mL of distilled water to obtain a solution A with a concentration of 1.0 wt %.

(2) Zinc oxide (ZnO, 50 g, 0.973 mol, molecular weight: 81.38) photocatalyst was added to the solution A, and uniformly mixing under stirring to obtain a suspension B with a solid content of 50 wt %.

(3) saturated $Fe(NO_3)_3$ solution (34 mL, 138 g/100 mL) was uniformly mixed with the suspension B in step (2) under stirring to obtain a suspension C. The molar ratio of the $Fe^{3+}$ ions and the zinc oxide was 20:100.

(4) The suspension C was dropwise added to a concentrated ammonia water by a syringe equipped with a No. 4-sized needle to form microspheres. The microspheres were aged for 30 minutes and dried at 80° C.

(5) The microspheres dried in step (4) were calcined at 1050° C. for 90 minutes to obtain the Fe-doped zinc oxide photocatalytic porous magnetic microspheres.

The porous magnetic microspheres of the present embodiment are used for test. The test results show that the magnetic porous microspheres of the present embodiment have an average particle size of 480 μm and a porosity of up to 84%.

The photocatalytic performance test is carried out by the same test method as in the application example 1. The results show that the degradation rate of the Fe-doped zinc oxide photocatalytic porous magnetic microspheres of the present embodiment is up to 89.6% when it is used for catalytic degradation of methylene blue dye for 40 minutes for the first time. The catalytic performance of the sample did not change significantly in 6 cycles of catalytic degradation.

Example 5

In the present embodiment, a method of preparing large-size high-porosity Fe-doped photocatalytic porous magnetic microspheres includes the following steps.

(1) sesbania powder (1.2 g) was dissolved in 100 mL of distilled water to obtain a solution A with a concentration of 1.2 wt %.

(2) titanium dioxide ($TiO_2$, 40 g, 0.5 mol, molecular weight: 79.87) photocatalyst (abbreviated as P25 below) was added to the solution A, and uniformly mixing under stirring to obtain a suspension B with a solid content of 40 wt %.

(3) saturated $FeCl_3$ solution (26.5 mL, concentration: 92 g/100 ml) was uniformly mixed with the suspension B in the step (2) under stirring to obtain a suspension C. The molar ratio of the $Fe^{3+}$ ions and the titanium dioxide was 30:100.

(4) The suspension C was dropwise added to a saturated hexamethylenetetramine solution by a syringe equipped with a No. 4-sized needle to form microspheres. The microspheres were aged for 60 minutes and dried at 70° C.

(5) The microspheres dried in the step (4) were calcined at 600° C. for 120 minutes to obtain Fe-doped titanium dioxide photocatalytic porous magnetic microspheres.

The porous magnetic microspheres of the present embodiment are used for test. The test results show that the porous magnetic microspheres of the present embodiment have an average particle size of 540 μm and a porosity of up to 81%.

The photocatalytic performance test is carried out by the same test method as in the embodiment application 1. The results show that the degradation rate of the Fe-doped titanium dioxide photocatalytic porous magnetic microspheres of the present embodiment is up to 90.9% when it is used for catalytic degradation of methylene blue dye in 40 minutes for the first time. The catalytic performance of the sample does not change significantly in 6 cycles of catalytic degradation.

What is claimed is:

1. A method of preparing large-size high-porosity Fe-doped photocatalytic porous magnetic microspheres, comprising:
    dissolving a soluble macromolecule in a distilled water to obtain a solution A having a concentration of 0.5-1.5 wt %;
    adding a photocatalyst to the solution A, and uniformly mixing the solution A and the photocatalyst under stirring to obtain a suspension B;
    mixing a saturated soluble ferric salt solution with the suspension B under stirring to obtain a suspension C;
    dropwise adding the suspension C to a high-concentration alkali solution by a syringe equipped with a needle of a suitable size to form microspheres; ageing and drying the microspheres; calcining the microspheres at 600-1100° C. for 30-120 minutes; and
    cooling the microspheres to obtain the large-size high-porosity Fe-doped photocatalytic porous magnetic microspheres.

2. The method of claim 1, wherein the soluble macromolecule is any one of a sesbania powder, a carboxymethyl cellulose and a guar gum.

3. The method of claim 1, wherein the photocatalyst is any one of a titanium dioxide, a lanthanum potassium titanate, a strontium titanate or a zinc oxide.

4. The method of claim 2, wherein the photocatalyst is any one of a titanium dioxide, a lanthanum potassium titanate, a strontium titanate or a zinc oxide.

5. The method of claim 1, wherein the suspension B has a solid content of 35-65 wt %.

6. The method of claim 1, wherein the soluble ferric salt is any one of a ferric chloride or a ferric nitrate.

7. The method of claim 1, wherein in the soluble ferric salt solution, a molar ratio of $Fe^{3+}$ ions to the photocatalyst is 15:100 to 45:100.

8. The preparation method of claim 1, wherein the alkali solution is any one of concentrated ammonia water, a saturated urea solution and a saturated hexamethylenetetramine solution.

9. The preparation method of claim 1, wherein an ageing time is 30-120 minutes, and a drying temperature is 60-80° C.

* * * * *